Figure 1:
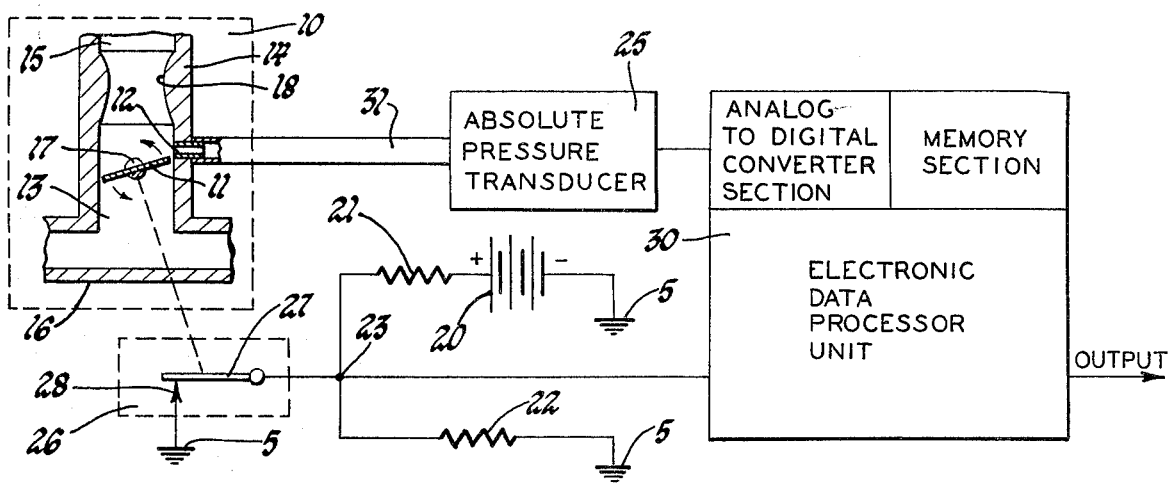

United States Patent [19]

McCarbery

[11] 4,271,797
[45] Jun. 9, 1981

[54] INTERNAL COMBUSTION ENGINE CONTROL SYSTEM

[75] Inventor: Gary P. McCarbery, Oxford, Mich.

[73] Assignee: General Motors Corporation, Detroit, Mich.

[21] Appl. No.: 105,726

[22] Filed: Dec. 20, 1979

[51] Int. Cl.³ .............................................. F02P 5/04
[52] U.S. Cl. .................... 123/412; 123/410; 123/415; 123/407
[58] Field of Search ............... 123/410, 412, 415, 406, 123/407, 418, 427, 494, 478, 480, 417, 492, 493

[56] References Cited

U.S. PATENT DOCUMENTS

| | | | |
|---|---|---|---|
| 3,561,411 | 2/1971 | Vasilescu | 123/412 |
| 3,584,521 | 1/1971 | Taeker | 123/407 |
| 3,596,644 | 8/1971 | Hutchins | 123/407 |
| 3,828,743 | 8/1974 | Ludwig | 123/412 |
| 3,968,778 | 7/1976 | Gambill | 123/415 |
| 3,978,833 | 9/1976 | Crall et al. | 123/415 |
| 4,128,885 | 12/1978 | Valck et al. | 123/415 |
| 4,151,818 | 5/1979 | Tateno | 123/410 |
| 4,167,923 | 9/1979 | Iwase et al. | 123/418 |
| 4,181,944 | 1/1980 | Jamauchi et al. | 123/480 |
| 4,220,126 | 9/1980 | Tomitu et al. | 123/407 |

Primary Examiner—Charles J. Myhre
Assistant Examiner—R. A. Nelli
Attorney, Agent, or Firm—Richard G. Stahr

[57] ABSTRACT

Electrical circuitry including a single absolute pressure transducer that is arranged to be exposed to substantially atmospheric pressure during a selected associated internal combustion engine operating condition produces an electrical pressure value indicating signal that is stored only when the pressure transducer is exposed to substantially atmospheric pressure. An electronic data processor unit preprogrammed to calculate a selected engine operating parameter value for the associated engine is preprogrammed to periodically effect a predetermined atmospheric pressure correction of the selected engine operating parameter value when the stored electrical pressure value indicating signal differs in a selected sense from a preselected value.

6 Claims, 2 Drawing Figures

INTERNAL COMBUSTION ENGINE CONTROL SYSTEM

This invention is directed to an internal combustion engine control system and, more specifically, to an internal combustion engine control system of the type that employs electrical signal representations of engine manifold pressure and atmospheric pressure that are derived from the output signal of a single absolute pressure transducer to effect engine control.

With modern internal combustion engines, there are various calculated engine operating parameters that are dependent upon both atmospheric pressure and engine load as indicated by engine manifold pressure. To determine engine load, either a vacuum transducer or an absolute pressure transducer may be employed. However, neither of these devices are capable of determining atmospheric pressure as a stand-alone arrangement. Consequently, an internal combustion engine control system that employs a single absolute pressure transducer that is arranged to sense both engine manifold pressure and atmospheric pressure is desirable.

It is, therefore, an object of this invention to provide an improved internal combustion engine control system.

It is another object of this invention to provide an improved internal commbustion engine control system that employs a single absolute pressure transducer to sense both engine manifold pressure and atmospheric pressure.

It is another object of this invention to provide an improved internal combustion engine control system of the type that employs electrical signal representations of engine manifold pressure and atmospheric pressure as derived from a single absolute pressure transducer to effect engine control.

It is an additional object of this invention to provide an improved internal combustion engine control system of the type that effects engine control in response to electrical signal representations of engine manifold pressure and atmospheric pressure as derived from a single absolute pressure transudcer that is arranged to be exposed to engine manifold pressure during certain engine operating conditions and to atmospheric pressure during other certain engine operating conditions through an engine port and valve combination that is arranged in such a manner that the valve is effective to expose the engine port to substantially atmospheric pressure and to engine manifold pressure as determined by selected respective engine operating conditions.

It is another object of this invention to provide an improved internal combustion engine control system of the type that effects engine control in response to electrical signal representations of engine manifold pressure and atmospheric pressure as derived from a single absolute pressure transducer that is exposed to engine manifold pressure with certain engine operating conditions and to atmospheric pressure during other certain engine operating conditions through the operation of an electronic data processor unit that is preprogrammed to effect a predetermined atmospheric pressure correction of a selected engine operating parameter value when the atmospheric pressure value differs in a selected sense from a preselected value.

In accordance with this invention, an internal combustion engine control system is provided wherein substantially atmospheric pressure is sensed during a selected operating condition of an associated internal combustion engine and a predetermined atmospheric pressure correction of a data processor unit calculated engine operating parameter value is effected when the atmospheric pressure value differs in a selected sense from a preselected value.

Figure 2:
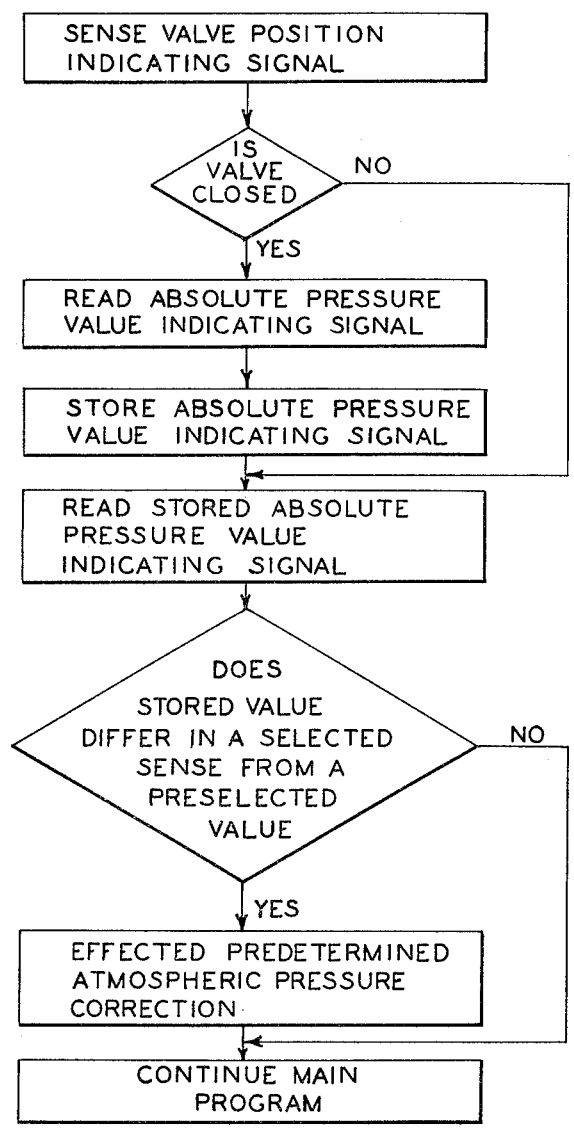

For a better understanding of the present invention, together with additional objects, advantages and features thereof, reference is made to the following description and accompanying drawing in which:

FIG. 1 sets forth the internal combustion engine control system of this invention in block form; and FIG. 2 is a flow chart of a periodically performed electronic data processor unit atmospheric pressure correction routine.

In the drawing, the point of reference or ground potential is illustrated by the accepted schematic symbol and is referenced by the numeral 5.

The internal combustion engine control system of this invention may be employed to effect the control of any internal combustion engine operating parameter value that is affected by atmospheric pressure and engine load as indicated by engine manifold pressure with only a single absolute pressure transducer. Examples of engine operating parameter values that may be affected by both engine manifold pressure and atmospheric pressure are ignition spark timing, exhaust gas recirculation, air-fuel ratio and automatic cruise control. It is to be understood that these engine operating parameters are exemplary only and are not intended to be exhaustive.

In FIG. 1 of the drawing, the internal combustion engine control system of this invention is set forth partially in schematic and partially in block form and includes an engine port and valve combination 10 that is arranged in such a manner that the valve 11, that may be a conventional throttle valve, is effective to expose the engine port 12 to substantially atmospheric pressure and to engine manifold pressure as determined by selected respective engine operating conditions; circuitry for producing an electrical valve position indicating signal of a selected potential level that indicates that valve 11 is in the closed position that includes a direct current potential source such as a conventional automotive type storage battery 20, two resistors 21 and 22 connected in series across the positive polarity output terminal of battery 20 and point of reference or ground potential 5 and an electrical switch 26 having a movable contact 27 and a stationary contact 28; a single absolute pressure transducer 25 and an electronic data processor unit 30.

The engine port and valve combination may be a port 12 in the engine intake passage 13 through which air is supplied to an associated engine, not shown. Although a conventional internal combustion engine type carburetor 14 of the downdraft type having the usual intake passage 13 that has an atmospheric air inlet 15 at one end and is connected to the engine intake manifold 16 at the opposite end is illustrated in FIG. 1, it is to be specifically understood that the internal combustion engine control system of this invention may also be used with associated internal combustion engines that are fueled by throttle body injection systems. Throttle valve 11 is located within engine intake passage 13 and is selectively adjustable in a manner well known in the art between closed, as shown in the drawing, and maximum open positions for controlling the amount of air flow to an associated internal combustion engine by rotating throttle valve 11 about pivot point 17 in a counterclockwise direction to open throttle valve 12 and in a clockwise direction to close throttle valve 12. Fuel may be inducted in the usual manner from a nozzle or fuel supply line, not shown, projecting into or adjacent the usual fixed area venturi section 18 in a manner well known in the art. With the engine port and valve arrangement shown in FIG. 1, engine port 12 located in the engine intake air passage 13 is so positioned relative to throttle valve 11 that engine port 12 is exposed to substantially atmospheric pressure when the throttle valve 11 is in the closed position as indicated in the drawing and to engine manifold pressure when the throttle valve 11 is not in the closed position. In FIG. 1, throttle valve 11 is shown in the engine idle speed position essentially closing engine intake passage 13 and is rotatable in a counterclockwise direction about pivot point 17 to a substantially vertical position essentially unlocking engine intake passage 13 in a manner well known in the art. As engine port 12 is positioned at a point just above the idle position of throttle valve 11 and is traversed by throttle valve 11 during its part throttle opening movements, engine port 12 is exposed to substantially atmospheric pressure when throttle valve 11 is closed and is exposed to substantially engine intake manifold pressure when throttle valve 11 is rotated in a clockwise direction away from the closed position.

Absolute pressure transducer 25 may be any of the many commercially available absolute pressure transducers of the type that produces an output electrical signal that is a function of absolute pressure value. One example of an absolute pressure transducer suitable for use with the internal combustion engine control system of this invention is marketed by the Delco Electronics Division of the General Motors Corporation, Kokomo, Indiana under the designation DL8814. Absolute pressure transducer 25 is in operative communication with engine port 12 through a line 31 connected between engine port 12 and the input port of absolute pressure transducer 25 whereby absolute pressure transducer 25 senses substantially atmospheric pressure when valve 11 is in the closed position to expose engine port 12 to substantially atmospheric pressure and to engine manifold pressure when valve 11 is not in the closed position to expose engine port 12 to engine intake manifold pressure.

To produce an electrical valve position indicating signal of a selected potential level that indicates valve 11 is in the closed position, resistors 21 and 22 may be connected in series across the positive polarity output terminal of battery 20 and point of reference or ground potential 5 and the movable contact 27 of electrical switch 26 may be connected to junction 23 between resistors 21 and 22. Electrical switch 26 may be of the normally open single pole-single throw type as illustrated in FIG. 1 having the movable contact 27 thereof operated into electrical circuit closing engagement with stationary contact 28 upon valve 11 being operated to the closed position. With this arrangement, the electrical valve position indicating signal upon junction 23 is of a substantially ground potential level when valve 11 is in the closed position and of a positive polarity potential level with respect to point of reference or ground potential 5 when valve 11 is not in the closed position. Alternatively, electrical switch 26 may be of the normally closed single pole-single throw type having the movable contact 27 thereof operated out of electrical circuit closing engagement with stationary contact 28 upon valve 11 being operated to the closed position. With this arrangement, the electrical valve position indicating signal upon junction 23 is of a positive polarity potential level with respect to point of reference or ground potential 5 when valve 11 is in the closed position and of a substantially ground potential level when valve 11 is not in the closed position. The potential level of this valve position indicating signal upon junction 23, therefore, indicates that engine port 12 is exposed to substantially atmospheric pressure when of a first potential level and indicates that engine port 12 is exposed to engine manifold pressure when of a second potential level.

The electronic data processor unit 30 may be any one of the many commercially available electronic data processor units well known in the art. One example of an electronic data processor unit suitable for use with the internal combustion engine control system of this invention is marketed by Motorola Semiconductor Products, Inc. of Phoenix, Arizona under the designation MC6800. As the MC6800 is a digital electronic data processor unit, should the selected absolute pressure transudcer 25 produce an analog output signal that is a function of absolute pressure value, the analog output signal of absolute pressure transducer 25 must be converted to a digital signal. This conversion operation may be performed in a conventional analog to digital converter circuit or by an analog to digital converter section included in the electronic data processor unit employed, as illustrated in FIG. 1 of the drawing. Should the selected absolute pressure transducer 25 produce a digital output signal that is a function of absolute pressure value, this analog to digital conversion step is, of course, not required. Similarly, should the selected electronic data processor unit 30 be of the analog type and should the selected absolute pressure transducer 25 produce an analog output signal that is a function of absolute pressure value, the analog to digital conversion step is also not required and should the selected absolute pressure transducer 25 produce a digital output signal that is a function of absolute pressure value, the digital output signal of absolute pressure transducer 25 must be converted to an analog signal by a conventional digital to analog converter circuit or by a digital to analog converter section contained within the electronic data processor unit. In any event, the circuitry for producing an electrical pressure value indicating signal includes at least the single absolute pressure transducer 25 but may also include either analog to digital converting circuitry or digital to analog converting circuitry depending upon whether the selected absolute pressure transducer 25 produces an analog or a digital output signal and whether the selected electronic data processor unit 30 is of the analog or digital type.

Whether the electrical pressure value indicating signal is the direct output signal of the selected absolute pressure transducer 25 or if the output signal of the absolute pressure transducer 25 is converted into an electrical pressure value indicating signal compatible with the selected electronic data processor unit 30, this electrical pressure value indicating signal is loaded into a memory circuit when valve 11 is in the closed position as indicated by the electrical valve position indicating signal present upon junction 23. Therefore, it is necessary that the selected electronic data processor unit 30 be programmed to recognize the electrical valve position indicating signal present upon junction 23. Upon recognizing the presence of the electrical valve position indicating signal selected to indicate that valve 11 is in the closed position, the selected electronic data processor unit 30 is programmed to load the electrical pressure value indicating signal into a memory circuit that may be a separate discrete memory circuit or a memory section of the selected electronic data processor unit 30 as shown in FIG. 1.

Electronic data processor unit 30 is preprogrammed to calculate a selected engine operating parameter value for an associated internal combustion engine in a manner well known in the automotive and electronic data processor art. The program arranged to calculate a selected engine operating parameter value includes at least one periodically performed atmospheric pressure correction determining routine that is preprogrammed to sense the electrical valve position indicating signal, to determine if the valve is in the closed position, to read and store the electrical pressure value indicating signal when the valve is in the closed position and to skip these read and store steps when the valve is not in the closed position, to read the stored electrical pressure value indicating signal, to determine if the stored electrical pressure value indicating signal so read differs in a selected sense from a preselected value and to effect a predetermined atmospheric pressure correction of the selected engine operating parameter value when the stored electrical pressure value indicating signal so read differs in the selected sense from the preselected value. This periodically performed atmospheric pressure correction determining routine is set forth as a flow diagram in FIG. 2.

As an example only, and without intention or inference of a limitation thereto, it will be assumed that data processor unit 30 is preprogrammed to calculate an engine ignition spark advance value for an associated internal combustion engine and that it is desired that ten engine crankshaft degrees ignition spark advance be added to the calculated value at altitudes in excess of 5000 feet above sea level. In an actual embodiment, the selected electronic data processor unit 30 repeats the engine ignition spark advance angle calculation every six milliseconds, consequently, the periodically performed atmospheric pressure correction determining routine hereinabove set forth and illustrated by the flow diagram of FIG. 2 is performed every six milliseconds. While the car is being driven by the associated internal combustion engine, therefore, the electrical valve position indicating signal upon junction 23 is sensed every six milliseconds. Consequently, each time the throttle valve 11 is allowed to be returned to the closed position in which engine port 12 is exposed to substantially atmospheric pressure, the electrical pressure value indicating signal however produced is read and stored in a memory circuit. The electrical pressure value indicating signal of atmospheric pressure, therefore, is updated each time throttle valve 11 is in the closed position and the latest stored electrical pressure value indicating signal is read for the remainder of the routine. When the stored electrical pressure value indicating signal value so read is less than the preselected atmospheric pressure at a 5000 ft. altitude, the engine is operating at an altitude at which additional ignition spark advance is required. Consequently, if the stored electrical pressure value indicating signal so read is less than the preselected value, an additional ten engine crankshaft degrees is added to the calculated ignition spark advance value.

Similarly, the calculation of other selected engine operating parameter values may be atmospheric pressure corrected in a similar manner through the use of only a single absolute pressure transducer.

While a preferredc embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. In an internal combustion engine control system of the type that employs electrical signal representations of engine manifold pressure and atmospheric pressure to effect engine control,
   an engine intake passage through which air is supplied to said engine;
   a valve located in said intake passage that is selectively adjustable between closed and maximum open positions for controlling the amount of air flow to said engine;
   a port in said intake passage so positioned relative to said valve that said port is exposed to substantially atmospheric pressure when said valve is in said closed position and to engine manifold pressure when said valve is not in said closed position;
   means for producing an electrical pressure valve indicating signal, said means including at least a single absolute pressure transducer of the type that produces an output electrical signal that is a function of absolute pressure value in operative communication with said port for sensing substantially atmospheric pressure when said valve is in said closed position and engine manifold pressure when said valve is not in said closed position;
   memory means; and
   circuit means for effecting the loading of said electrical pressure valve indicating signal into said memory means when said valve is in said closed position.

2. In an internal combustion engine control system of the type that employs digital representations of engine manifold pressure and atmospheric pressure to effect engine control,
   an engine intake passage through which air is supplied to said engine;
   a valve located in said intake passage that is selectively adjustable between closed and maximum open positions for controlling the amount of air flow to said engine;
   a port in said intake passage so positioned relative to said valve that said port is exposed to substantially atmospheric pressure when said valve is in said closed position and to engine manifold pressure when said valve is not in said closed position;
   a single absolute pressure transducer of the type that produces an output electrical signal that is a function of absolute pressure value in operative communication with said port for sensing substantially atmospheric pressure when said valve is in said closed position and engine manifold pressure when said valve is not in said closed position;
   means for converting said output signal of said pressure transducer to a digital representation of the sensed pressure value;
   a digital memory means; and circuit means for effecting the loading of said digital representation of the sensed pressure value into said memory means when said valve is in said closed position.

3. An internal combustion engine control system for use with internal combustion engines having an intake passage through which air is supplied to the engine and a valve located in the intake passage that is selectively adjustable between closed and maximum open positions for controlling the amount of air flow to the engine comprising:

a port in said intake passage so positioned relative to said valve that said port is exposed to substantially atmospheric pressure when said valve is in the closed position and to engine manifold pressure when said valve is not in said closed position;

means for producing an electrical valve position indicating signal of a selected potential level that indicates said valve is in said closed position;

means for producing an electrical pressure value indicating signal, said means including at least a single absolute pressure transducer of the type that produces an output electrical signal that is a function of absolute pressure value in operative communication with said port for sensing substantially atmospheric pressure when said valve is in said closed position and engine manifold pressure when said valve is not in said closed position; and an electronic data processor unit that is preprogrammed to calculate a selected engine operating parameter value for an associated internal combustion engine, said program including at least one periodically performed atmospheric pressure correction determining routine that is preprogrammed to sense said electrical valve position indicating signal, to determine if said valve is in said closed position, to read and store said electrical pressure value indicating signal when said valve is in said closed position and to skip said read and store steps when said valve is not in said closed position, to read a stored said electrical pressure value indicating signal, to determine if the stored said electrical pressure value indicating signal so read differs in a selected sense from a preselected value and to effect a predetermined atmospheric pressure correction of said selected engine operating parameter value when the stored said electrical pressure value indicating signal to read differs in said selected sense from said preselected value.

4. An internal combustion engine control system for use with internal combustion engines having an intake passage through which air is supplied to the engine and a valve located in the intake passage that is selectively adjustable between closed and maximum open positions for controlling the amount of air flow to the engine comprising:

a port in said intake passage so positioned relative to said valve that said port is exposed to substantially atmospheric pressure when said valve is in the closed position and to engine manifold pressure when said valve is not in said closed position;

means for producing an electrical valve position indicating signal of a selected potential level that indicates said valve is in said closed position;

a single absolute pressure transducer of the type that produces an output electrical signal that is a function of absolute pressure value in operative communication with said port for sensing substantially atmospheric pressure when said valve is in said closed position and engine manifold pressure when said valve is not in said closed position;

means for converting said output signal of said pressure transducer to a digital representation of the sensed pressure value; and an electronic data processor unit that is preprogrammed to calculate a selected engine operating parameter value for an associated internal combustion engine, said program including at least one periodically performed atmospheric pressure correction determining routine that is preprogrammed to sense said electrical valve position indicating signal, to determine if said valve is in said closed position, to read and store said digital representation of the sensed pressure value when said valve is in said closed position and to skip said read and store steps when said valve is not in said closed position, to read a stored said digital representation of the sensed pressure value, to determine if the stored said digital representation of the sensed pressure value so read differs in a selected sense from a preselected value and to effect a predetermined atmospheric pressure correction of said selected engine operating parameter value when the stored said digital representation of the sensed pressure value so read differs in said selected sense from said preselected value.

5. An internal combustion engine control system comprising:

an engine port and valve combination arranged in such a manner that said valve is effective to expose said engine port to substantially atmospheric pressure and to engine manifold pressure as determined by selected respective engine operating conditions;

means for producing an electrical valve position indicating signal of a first potential level that indicates said engine port is exposed to substantially atmospheric pressure and of a second potential level that indicates said engine port is exposed to engine manifold pressure;

means for producing an electrical pressure value indicating signal, said means including at least a single absolute pressure transducer of the type that produces an output electrical signal that is a function of absolute pressure value in operative communication with said engine port; and an electronic data processor unit that is preprogrammed to calculate a selected engine operating parameter value for an associated internal combustion engine, said program including at least one periodically performed atmospheric pressure correction determining routine that is preprogrammed to sense said electrical valve position indicating signal, to determine if said engine port is exposed to substantially atmospheric pressure, to read and store said electrical pressure value indicating signal when said engine port is exposed to substantially atmospheric pressure and to skip said read and store steps when said engine port is exposed to engine manifold pressure, to read a stored said electrical pressure value indicating signal, to determine if the stored said electrical pressure value indicating signal so read differs in a selected sense from a preselected value and to effect a predetermined atmospheric pressure correction of said selected engine operating parameter value when the stored said electrical pressure value indicating signal so read differs in said selected sense from said preselected value.

6. An internal combustion engine control system comprising:
- an engine port and valve combination arranged in such a manner that said valve is effective to expose said engine port to substantially atmospheric pressure and to engine manifold pressure as determined by selected respective engine operating conditions;
- means for producing an electrical valve position indicating signal of a first potential level that indicates said engine port is exposed to substantially atmospheric pressure and of a second potential level that indicates said engine port is exposed to engine manifold pressure;
- a single absolute pressure transducer of the type that produces an output electrical signal that is a function of absolute pressure value in operative communication with said port;
- means for converting said output signal of said pressure transducer to a digital representation of the sensed pressure value; and
- an electronic data precessor unit that is preprogrammed to calculate a selected engine operating parameter value for an associated internal combustion engine, said program including at least one periodically performed atmospheric pressure correction determining routine that is preprogrammed to sense said electrical valve position indicting signal, to determine if said engine is exposed to substantially atmospheric pressure, to read and store said digital representation of the sensed pressure value when said engine port is exposed to substantially atmospheric pressure and to skip said read and store steps when said engine port is exposed to engine manifold pressure, to read a stored said digital representation of the sensed pressure value, to determine if the stored said digital representation of the sensed presure value so read differs in a selected sense from a preselected value and to effect a predetermined atmospheric pressure correction of said selected engine operating parameter value when the stored said digital representation of the sensed pressure value so read differs in said selected sense from said preselected value.

* * * * *